United States Patent Office 3,097,497
Patented July 16, 1963

3,097,497
OXYGEN SUPPLY SYSTEMS
Peter W. Fitt, Yeovil, England, assignor to
Normalair Limited, Yeovil, England
Filed Aug. 10, 1960, Ser. No. 48,778
Claims priority, application Great Britain Aug. 14, 1959
5 Claims. (Cl. 62—52)

This invention relates to oxygen supply systems incorporating liquid oxygen converters, for use with breathing apparatus.

Although liquid oxygen systems are in current use in air forces of the world, the use of liquid oxygen in industrial breathing applications has been limited by shortcomings of existing systems. The main short-coming of liquid oxygen systems in current use is that they do not cater for prolonged use in any attitude other than the one in which the unit is maintained with its axis vertical. In many industrial applications for instance, mine rescue operations, the user may find it necessary to crawl for long periods such that this breathing apparatus has its axis in the horizontal position.

It is an object of the invention therefore to provide an oxygen supply system incorporating a liquid oxygen converter in which the direction and nature of the gravitational field does not affect the operation thereof.

It is a further object of the invention to provide an oxygen supply system of simple construction to meet the requirements of a cheap, efficient industrial set.

The invention consists in an oxygen supply system, a liquid oxygen converter having automatic pressure controlling means whereby oxygen passes successively through substantially the bottom wall of said converter, through heat exchanging conduit means external of said converter, through heat exchanging conduit means inside said converter and through further conduit means external of said converter, oxygen flow through said conduits continuing according to demand until said converter attains a chosen pressure whereafter oxygen flows through conduit means communicating with the gas phase region of said converter.

The invention also consists in an oxygen supply system according to the preceding paragraph wherein said converter is of heat insulating construction, having associated therewith a combined filler, build-up and vent valve, pressure opening/pressure closing valve, pressure relief valve and differential check valve.

The invention also consists in an oxygen supply system according to the second preceding paragraph wherein said heat exchanging conduit internal of said converter delivers gaseous oxygen to delivery conduit means past said differential check valve, said heat exchanging conduits communicating with said pressure opening/pressure closing valve, said gas phase region communicating with said delivery conduit means by said combined filler, build-up and vent valve and by said pressure opening/pressure closing valve.

The invention also consists in an operationally inclinable and invertible liquid oxygen converter having automatic pressure controlling means whereby oxygen passes successively through converter low pressure outlet means, through heat exchanging conduit means external of said converter, through heat exchanging conduit means inside said converter and through further conduit means external of said converter, oxygen flow through said conduits continuing according to demand until said converter attains a chosen pressure whereafter oxygen flows through converter high pressure outlet means.

The invention also consists in a portable, operationally inclinable and invertible liquid oxygen converter having body member with filling opening and closure member means and means sealing said body member and said closure member means, said converter having automatic pressure controlling means whereby oxygen passes successively through converter low pressure outlet means through heat exchanging conduit means inside said converter and through further conduit means external of said converter, oxygen flow through said conduits continuing according to demand until said converter attains a chosen pressure whereafter oxygen flows through converter high pressure outlet means.

The invention also consists in a portable liquid oxygen converter according to the preceding paragraph having heat exchanging conduit means external of said converter and said heat exchanging conduit means inside said converter, low pressure outlet means, and high pressure outlet means, secured to and removable with said closure member means.

The invention also consists in a portable liquid oxygen converter according to the second preceding paragraph having pressure closing valve, differential check valve and pressure relief valve, said valves being secured to and removable with said closure member means.

The invention also consists in a portable liquid oxygen converter according to the third preceding paragraph having said low pressure outlet means in communication with said heat exchanging conduit means external of said converter and with said heat exchanging conduit means inside said converter, said pressure closing valve interrupting oxygen flow through said heat exchanging conduits when said chosen pressure is attained whereafter oxygen flows from converter high pressure outlet means through differential check valve into said further conduit means external of said converter, pressure in said converter being limited by said relief valve.

The invention also consists in a portable liquid oxygen converter according to the fourth preceding paragraph having heat insulation means for said body member.

The invention also consists in a portable liquid oxygen converter according to the fifth preceding paragraph having said converter body member with inner and outer metal insulated by way of a vacuum.

The invention also consists in a portable liquid oxygen converter according to the sixth preceding paragraph having said converter body member with inner and outer metal walls insulated by way of a closed pore cellular material.

The invention also consists in a portable liquid oxygen converter according to the seventh preceding paragraph having said converter body member with a fluid retaining inner member of metal surrounded and insulated by way of a closed pore cellular material.

The invention also consists in a portable liquid oxygen converter according to the eighth preceding paragraph wherein said closure member is insulated by closed pore cellular material.

The invention also consists in a portable liquid oxygen converter according to the ninth preceding paragraph wherein said closure member has inner and outer metal walls insulated by way of a vacuum.

The invention also consists in a liquefied gas converter wherein liquid and gas flow substantially as oxygen flows into said converter according to any of the fourteen preceding paragraphs.

Further objects and advantages of the invention will become apparent from the following detailed description with reference to the accompanying drawings:

Referring to the accompanying drawings.

Figure 1:
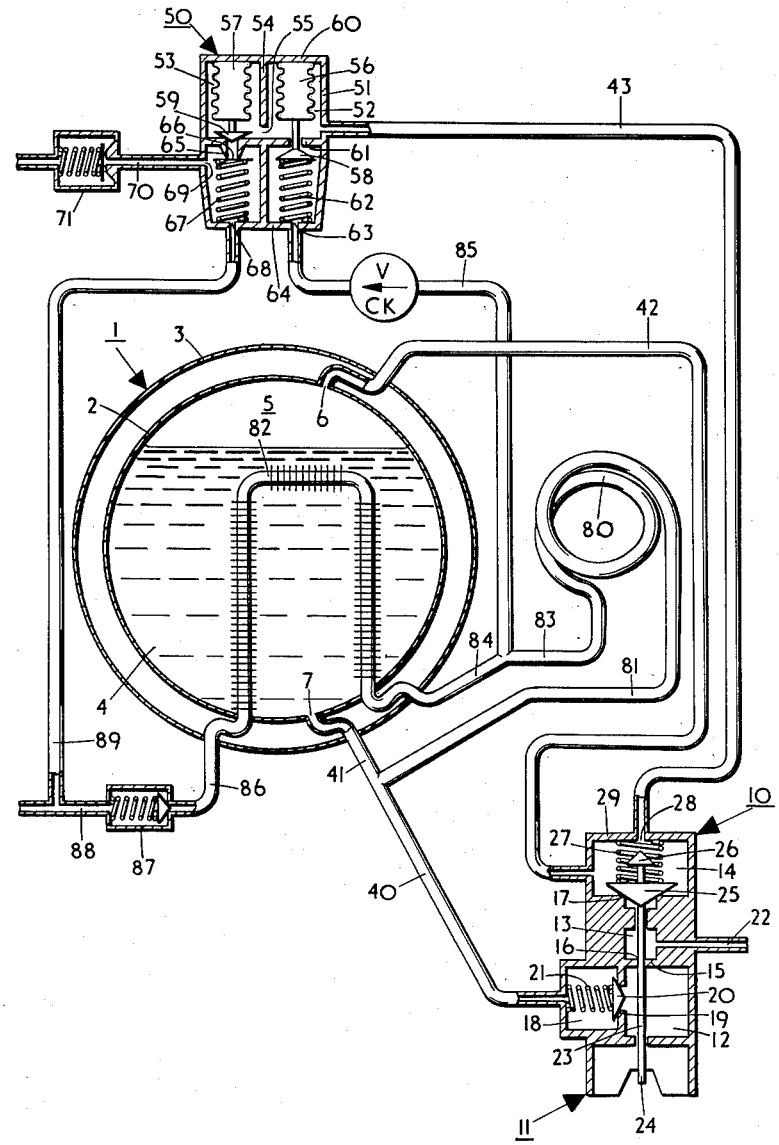
FIGURE 1 shows an oxygen supply system incorporating a liquid oxygen converter.

In carrying the invention into effect according to one convenient form by way of example only, referring to FIGURE 1, we provide a portable, oxygen supply system comprising an operationally inclinable and invertible liquid oxygen converter generally indicated at 1 having an inner shell 2 and an outer shell 3 suitably separated and subjected to a high degree of vacuum. The converter 1 contains liquid oxygen indicated at 4 and gaseous oxygen indicated at 5, said converter is provided at the top with a high pressure outlet 6 for gaseous oxygen and at the bottom with a low pressure outlet 7 for liquid oxygen under conditions hereinafter to be described. The terms top and bottom relate to the normal stored position of the converter but it is an object of this invention that the converter can be used with its axis in any position for a considerable time without impairing its use.

A combined filler, build-up and vent valve generally indicated at 10 comprises a hollow body 11, said body 11 is divided interiorly with three compartments indicated at 12, 13 and 14 by way of shoulder member 15 carrying a sealing gland 16 and a valve seat 17, chamber 12 also communicates with a chamber 18 by way of valve seat 19, said chamber 18 houses a non-return valve 20 adapted to be urged against said valve seat 19 by way of spring 21, and is in communication with converter outlet 7 by way of conduits 40 and 41. Chamber 13, disposed between shoulder member 15 and valve seat 17 is adapted to communicate with atmosphere by way of vent 22. A valve assembly 23 is provided within said hollow body 11 and comprises a push-rod 24 slidable within gland 16 in a sealing manner, said push-rod 24 carries two valves 25 and 26 within compartment 14 at end of push-rod 24 remote from compartment 12, said valve 25 being urged against valve seat 17 by way of spring 27. Under certain conditions valve 26 is adapted to close an outlet 28 within end wall 29 of hollow body 11 against force in said spring 27. Communication is provided between compartment 14 and high pressure outlet 6 of said converter 1 by way of conduit 42. Compartment 14 is in communication with a pressure opening/pressure closing valves generally indicated at 50 by way of outlet 28 and a conduit 43. The pressure opening/pressure closing valves 50 comprises a housing 51 divided into two chambers 52 and 53 by way of a dividing member 54 which allows communication between chambers 52 and 53 by way of an opening 55. Each chamber 52 and 53 is provided with a pressure sensing bellows 56 and 57 carrying valves 58 and 59 respectively, said bellows 56 and 57 disposed at end 60 of housing 51 remote from the converter 1. When the pressure in the converter is below working pressure, bellows 56 tend to urge valve 58 away from a valve seat 61 against force in spring 62; an opening 63 is provided in end 64 of housing 51 remote from end 60. When the pressure in the converter is below the working pressure the bellows 57 tend to urge valve 59 towards a valve seat 65, and said valve seat 65 is adapted to form a seat on the other side thereof for a valve 66 urged thereon by way of a spring 67; an opening 68 is provided in end 64 of housing 51 remote from end 60. A further opening 69 provides communication between chamber housing valve 66 and spring 67 to provide a vent to atmosphere by way of conduit 70 and a relief valve 71.

A heater coil indicated at 80 is provided outside converter 1 and is in communication at one end with low pressure outlet 7 of converter 1 by way of a conduit 81 and said conduit 41, and at the other end with finned heat exchange piping 82 contained within the converter by way of conduits 83 and 84. Opening 63 in end 64 of pressure opening/pressure closing valve 50 is adapted to communicate with conduits 83 and 84 by way of conduit 85 and the end of said finned heat exchange piping 82 remote from heater coil 80, outside converter 1 communicates to a demand or like regulator (not shown) by way of conduit 86, differential check valve 87 and conduit 88, communication also being provided to said demand or like regulator (not shown) from pressure opening/pressure closing valve to conduit 88 by way of a conduit 89 from opening 68 within end 64 therein.

In operation of the invention, the converter 1 is filled with liquid oxygen under pressure by way of compartment 12 in filler, build-up and vent valve 10 which urges non-return valve 20 away from valve seat 19 against force in spring 21 thus allowing communication with liquid outlet 7 in converter 1 by way of conduits 40 and 41. During filling operation the top of the converter 1 vents to atmosphere with valve 25 in the open position and valve 26 closing outlet 28, by way of outlet 6, conduit 42, chambers 13 and 14 and vent 22 contained within valve 10. After filling the converter 1, the filler, build-up and vent valve is set to the build-up condition, that is valve 25 is urged against valve seat 17 by the action of push-rod 24 assisted by spring 27, the operating pressure therefore rises as a result of oxygen circulation from the low pressure outlet 7 through the heater coil 80 by way of conduits 41 and 81. From the coil 80 gas passes through conduits 83, 85, 43, 42 thus returning to the high pressure outlet 6 in the gas phase of the converter. When oxygen is used by a demand regulator (not shown) from conduit 88, heat from the heater coil 80 is communicated to the liquid in the converter 1 by way of the finned heat exchange piping 82 causing a rise of pressure therein. The gaseous pressure in the converter 1 is thereby controlled by passing oxygen successively from the low pressure outlet 7 of the converter 1 through the heating coil 80 by way of conduits 41 and 81 and then through the finned heat exchange piping 82 by way of conduits 83 and 84 before delivery to conduit 88 by way of conduit 86 and differential check valve 87. Prolonged take-off of oxygen from the low pressure outlet 7 would result in a continuous rise of pressure inside converter 1 and to avoid this occurrence, use is made of the pressure opening valve 59, which communicates with the high pressure outlet 6 in the top of the converter 1, by way of conduit 42, compartment 14 within combined filler, build-up and vent valve 10, and conduit 43. When the pressure attains a chosen value, say 110 lb. per sq. inch, the bellows 57 are compressed sufficiently to open pressure opening valve 59 allowing oxygen to be delivered to the demand regulator (not shown) by way of conduit 89, as valve 59 is open and the pressure of oxygen urges valve 66 away from valve seat 65 against force in spring 67. The pressure opening valve 59 therefore controls the delivery of oxygen to the demand regulator (not shown) without passage through the finned heat exchange piping 82. At this instance there is no flow through the finned heat exchange piping 82 to conduit 88 due to the action of the differential check valve 87.

It will be understood by those skilled in the art that with the system according to this invention, the operating pressure within the converter 1 will be maintained irrespective of its attitude and it is immaterial whether liquid, vapour or a mixture of liquid and vapour is drawn off from the low pressure outlet 7, the net effect will still maintain a transference of heat within the converter 1 thus raising the pressure therein. Similarly the delivery of liquid, vapour or a mixture of liquid and vapour from the high pressure outlet 6 will not result in introduction of heat to the liquid and therefore, any pressure rise that may occur will be due only to the inefficiency of the thermal insulation of the converter.

Figure 2:
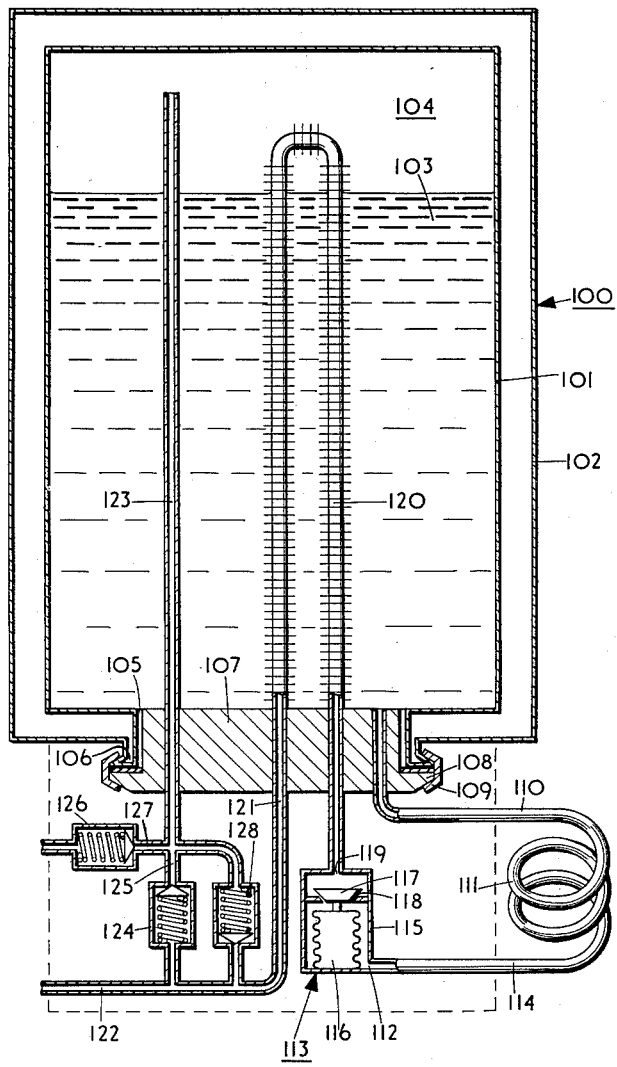
FIGURE 2 shows a further embodiment of an oxygen supply system incorporating a further liquid oxygen converter.

In carrying the invention into effect according to a further embodiment by way of example only, referring to FIGURE 2, we provide a portable oxygen supply comprising an operationally inclinable and invertible liquid oxygen converter generally indicated at 100 comprising a substantially cylindrical vessel provided with an inner shell 101 and an outer shell 102 suitably separated by heat insulation means which may comprise a high degree of vacuum or closed pore cellular material. The converter 100 contains liquid oxygen indicated at 103 and gaseous oxygen indicated at 104. The converter 100 is fully enclosed apart from an opening in the inner shell 101 and outer shell 102 at lower end indicated at 105 which terminates in a V flange indicated at 106. A closure member 107 carries a V flange 108 adapted to mate with the V flange 106 in a sealing manner by way of a clamp 109, convenient jointing material being provided between the mating faces to ensure the retention of oxygen pressure. Most known jointing materials become rigid at temperatures approaching that of liquid oxygen and it is therefore sometimes advisable for such a joint to be maintained at substantially ambient temperature. The closure member 107 is provided with a conduit 110 adapted to be flush with the internal face of said closure member 107 and is in communication with a heating coil 111, said heating coil communicating with an inlet 112 of a pressure closing valve 113 by way of a conduit 114. The pressure closing valve 113 comprises a casing 115 having housed therein a pressure sensing bellows 116 carrying a valve 117, said valve 117 is urged towards a valve seat 118 by way of said bellows 116 as the pressure increases. An outlet 119 is provided within casing 115 at end remote from the end carrying bellows 116, and communicates with finned U shaped heat exchange piping 120 within converter 100, said piping 120 secured to closure member 107 and arranged to extend almost to the bottom of the converter 100. The other end of the heat exchange piping 120 passes to a demand or like regulator (not shown) by way of conduits 121 and 122. Also housed within the closure member 107 is a long outlet conduit 123 extending almost to the bottom of converter 100 and in communication with a differential check valve 124 by way of conduit 125. A check valve 128 provides for flow from conduit 121 to conduit 125. A relief valve 126 provides a vent to atmosphere from outlet conduit 123 by way of conduit 127.

In operation of the invention the converter 100 is filled with liquid oxygen with the opening 105 uppermost and the closure member 107 carrying conduits 110 and 123 and finned heat exchange piping 120 is inserted therein and secured therein by way of clamps 109 and jointing material as hereinbefore described. The gaseous pressure within the converter 100 is controlled by passing oxygen successively through the heating coil 111 from conduit 110 in the base of the converter 100 thereby gaining heat. The oxygen then passes through the finned heat exchange piping 120 by way of pressure closing valve 113 and conduit 119 before delivery to the demand regulator (not shown) by way of conduit 121. Oxygen also flows to the regulator from the converter 100 by way of the long outlet conduit 123 and differential check valve 124. The pressure closing valve 113 is provided to prevent oxygen flow through the finned heat exchange piping 120 when a chosen gaseous pressure has been reached.

It is convenient to provide insulation for exposed parts of the system adjacent to the converter such as the closure member 107 and adjacent parts of the system. This may be effected by way of non-interconnected foamed material surrounding the inner wall of the converter.

It will be apparent to those skilled in the art that numerous modifications and refinements may be carried out without departing from the scope of the invention in that the heating coil may be arranged around the converter 100 to reduce entry of heat radiation or the converter may be modified by carrying a "neck" whereby the closure member 107 is deepened and provided with a high degree of vacuum with the heating coil arranged around the neck.

I claim as my invention:

1. An operationally inclinable and invertible liquid oxygen converter having automatic pressure controlling means whereby when the pressure is below normal working pressure oxygen passes successively through a low pressure outlet means from said converter, through heat exchanging conduit means external of said converter, through heat exchanging conduit means inside said converter and thence to a delivery conduit, said heat exchanging conduit means inside said converter being suitably shaped and positioned in such a manner that a portion thereof is substantially always in contact with the liquid phase of said converter whatever the attitude of said converter, when the pressure in said converter attains a chosen normal working pressure oxygen flows through a high pressure outlet means of said converter to said delivery conduit.

2. An operationally inclinable and invertible liquid oxygen converter having automatic pressure controlling means comprising a pressure opening valve, said converter being provided with a low pressure outlet in conduit communication with an external heat exchanger, said external heat exchanger, being in conduit communication with a heat exchanging conduit means inside said converter, said heat exchanging conduit means inside said converter being suitably shaped and positioned in such a manner that a portion thereof is substantially always in contact with the liquid phase of said converter whatever the attitude of said converter, said internal heat exchanger communicating with the delivery conduit by way of a differential check valve, said pressure opening valve being disposed in a conduit leading from a high pressure outlet to said delivery conduit.

3. An operationally inclinable and invertible liquid oxygen converter system having an outomatic pressure controlling means comprising a pressure closing valve, said converter being provided with a low pressure outlet, a high pressure outlet, a heat exchanging conduit inside said converter, an external heat exchanger and a delivery conduit, said heat exchanging conduit inside said converter being suitably shaped and positioned in such a manner that a portion thereof is substantially always in contact with the liquid phase of said converter whatever the attitude of said converter, said converter system having a low pressure flow circuit comprising said low pressure outlet, external heat exchanging conduit and said delivery conduit, said low pressure circuit containing said pressure closing valve, said converter system also having a high pressure circuit comprising said high pressure outlet and a different check valve, communicating with said delivery conduit.

4. An operationally inclinable and invertible liquid oxygen converter system as claimed in claim 3 and further including an automatic rapid pressure build upon when the converter is stored in the upright position provided by a build up circuit consisting in a portion of the low pressure circuit and a portion of said high pressure circuit connected by a conduit containing a non-return valve, said conduit joining said low pressuree circuit down stream of both said external heat exchanger and said pressure closing valve, the other end of said conduit joining said high pressure circuit upstream of said differential check valve, said non-return valve permitting flow of oxygen from said low pressure circuit to said high pressure circuit when the pressure in the system is below normal and said pressure closing valve is open.

5. An operationally inclinable and invertible liquid oxygen converter system having an automatic pressure controlling system comprising a pressure closing valve and a pressure opening valve, said converter being provided with a low pressure outlet, a high pressure outlet, a heat exchanging conduit inside said converter, an external heat exchanger, a differential check valve, a non-return valve and a delivery conduit, said heat exchanging conduit inside said converter being suitably shaped and positioned in such a manner that a portion thereof is substantially always in contact with the liquid phase of said converter whatever the attitude of said converter, said system having a build up circuit for rapid pressure build up within the system when the converter is in the upright position, said build up circuit comprising low pressure outlet, external heat exchanger, non-return valve, pressure closing valve and said high pressure outlet, said system also having a low pressure circuit for building up and maintaining pressure upon demand comprising low pressure outlet, external heat exchanger, internal heat exchanging conduit, differential check valve and said delivery conduit, said system also having a high pressure circuit to supply oxygen without increasing pressure in the system comprising said high pressure outlet, pressure opening valve and said delivery conduit.

References Cited in the file of this patent

UNITED STATES PATENTS

| | | |
|---|---|---|
| 2,260,357 | Zenner | Oct. 28, 1941 |
| 2,842,942 | Johnston et al. | July 15, 1958 |
| 2,964,919 | Howlett | Dec. 20, 1960 |
| 2,970,452 | Beckman et al. | Feb. 7, 1961 |